United States Patent

Watson et al.

[11] Patent Number: 5,908,260
[45] Date of Patent: Jun. 1, 1999

[54] CONNECTOR DEVICE

[75] Inventors: Paul John Watson, Surrey; Colin James Chalkley, Wiltshire, both of United Kingdom

[73] Assignee: Kee Klamp Limited, Reading, United Kingdom

[21] Appl. No.: 08/908,516

[22] Filed: Aug. 7, 1997

[30] Foreign Application Priority Data

Aug. 7, 1996 [GB] United Kingdom .................... 9616588

[51] Int. Cl.⁶ ..................................................... F16B 9/00
[52] U.S. Cl. ............................... 403/4; 403/205; 403/364
[58] Field of Search .................................. 403/217, 218, 403/219, 170, 171, 174, 175, 176, 178, 205, 3, 4, 364

[56] References Cited

U.S. PATENT DOCUMENTS

| | | | |
|---|---|---|---|
| 2,863,682 | 12/1958 | Canepa | 403/175 |
| 3,881,830 | 5/1975 | Kato et al. | 403/171 |
| 3,912,410 | 10/1975 | Pofferi . | |
| 4,864,795 | 9/1989 | Burg | 403/174 X |
| 5,605,410 | 2/1997 | Pantev | 403/176 X |

FOREIGN PATENT DOCUMENTS

| | | | |
|---|---|---|---|
| 609571 | 5/1926 | France | 403/174 |
| 366387 | 12/1938 | Italy | 403/171 |
| 600163 | 11/1959 | Italy | 403/175 |
| 384669 | 12/1932 | United Kingdom | 403/217 |
| 552105 | 3/1943 | United Kingdom . | |

*Primary Examiner*—Harry C. Kim
*Attorney, Agent, or Firm*—Young & Thompson

[57] ABSTRACT

A connector device (20,60) for securing an additional rigid member (13,13'), such as a rod or tube, to a rigid member (12,12') of an existing assembly of rigid members comprises a body (21) having a first region (22) for securing relative to an end of a first rigid member (13,13') and a second region (23) adapted to cooperate with another add-on type connector device (20,60) to embrace a part of a second rigid member (12,12') and form a structural interconnection between the rigid members, the first region (22) of the body (20) having a major axis (28) which is substantially aligned relative to the length direction of at least an end portion of the first rigid member and the second region (23) having an end zone which at least in part lies substantially obliquely relative to the major axis and provides a recess (24) which locates part of the second rigid member (12,12').

19 Claims, 6 Drawing Sheets

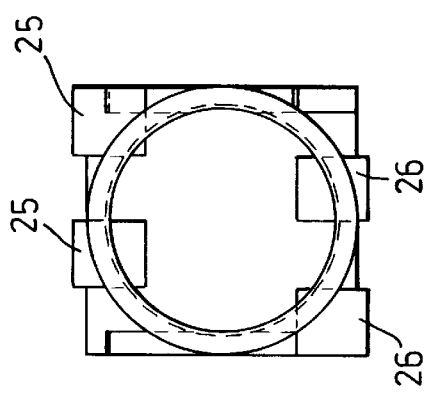
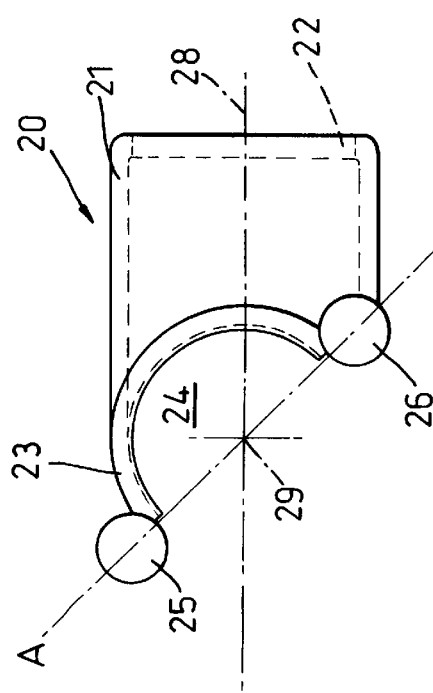
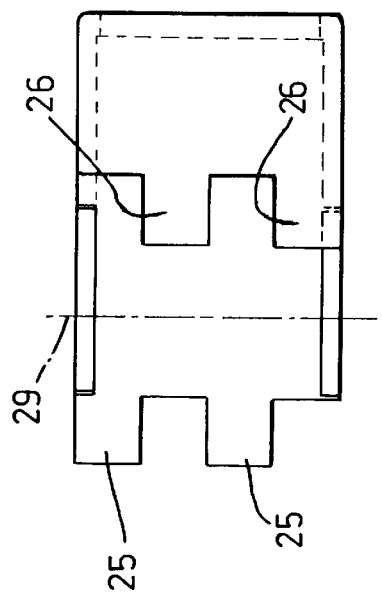

CONNECTOR DEVICE

The present invention relates to a connector device for forming a structural interconnection between two rigid members.

More specifically but not exclusively the invention relates to a connector device of an "add on" type which allows an existing structural assembly of interconnected members to be extended without the need to dismantle any part of the existing assembly.

The structural assembly with which the connector device of the present invention may be used to advantage may be of the type comprising rods or tubes interconnected by multi-way connectors for joining three or more lengths of said rods or tubes. Two of said three or more "lengths" usually will be sections of a continuous length of rod or tube.

Examples of structural assemblies to which the present invention relates include handrails, balustrades, shelving and storage systems, climbing frames and scaffolding.

"Add-on" devices are known for allowing additional rods or tubes to be connected to an existing structural assembly of rods or tubes without the need to dismantle any part of the existing assembly. The known devices can operate satisfactorily, but increase undesirably the number of connector devices which a manufacturer must design and produce. This results in cost and storage disadvantages.

An objective of the present invention is provision of an add-on type connector device, and a series of add-on type connector devices, which allows widely differing additions to an existing structural assembly without substantially increasing the number of types of connector devices that must be made available.

According to an aspect of the present invention an add-on type connector device comprises a body having a first region for securing relative to an end of a first rigid member and a second region adapted to cooperate with another add-on type connector device to embrace a part of a second rigid member and form a structural interconnection between the rigid members, the first region of the body having a major axis which is substantially aligned relative to the length direction of at least an end portion of said first rigid member and the second region having an end zone which at least in part lies substantially obliquely relative to said major axis.

The end zone of the second region preferably lies, in effect, in a plane which is parallel with, and more preferably intersects, a major axis of the second rigid member.

The end zone of the second region preferably has associated therewith a recess, preferably a recess of substantially semi-cylindrical shape. Thus parts of the end zone at either side of the recess may lie at diametrically opposite positions of a cylindrical outer surface of a rod or tube which fits into the recess. The recess preferably comprises at least a pair of axially spaced semi-cylindrical bearing surfaces against which a rod or tube of substantially equivalent outer diameter may rest and be secured.

An add-on type connector device of the present invention may be of a type which comprises a body having a first region for securing relative to an end of a first rigid member and a second region having an end zone which comprises a recess formation to accommodate a part of the outer periphery of a second rigid member, the end zone additionally comprising a first end formation which lies between said first body region and a major axis of said recess formation and a second end formation which lies beyond said major axis.

The major axis of the first region of the body may intersect or lie off-set relative to the major axis of the recess or a second rigid member.

The end zone preferably comprises end formations which in effect lie in a plane inclined at 45° to the major axis of the first region. Two connector devices with said 45° feature therefore may be orientated either to provide an in-line interconnection of two rigid members, to lie typically but not necessarily at right angles to a rigid member contained within confronting recesses, or a right angled interconnection between said two rigid members.

Other angles may be employed. E.g. a 30° inclination to the major axis will give the option for an in line or 60° interconnection.

The end formations preferably are profiled and arranged, e.g. with an off-set configuration of lug portions, so that the end formations of respective connector devices may lie interdigitated in either of two relative orientations of the deices.

Two connector devices may be held captive abut a rigid member by locking means which may, for example, comprise bolts or the like arranged to extend through aligned apertures in lug formations or which may, far example, comprise an external member such as a sleeve to surround respective lug formations. Two connector devices may be pivotally interconnected for ease of fitting around a so rigid member. A hinge pin may extend through apertures in the lug formations.

A structural member may be secured in conventional manner to a first end region. A structural member may be received in an end passage of a first end region. The passage may comprise a pair of axially spaced and inwardly extending ribs to act as gauge rings to closely surround an inserted rigid structural member. The end region may comprise a known boss and grub-screw arrangement for securing the structural member in the connector device.

An add-on type connector device as aforedescribed ray be use either in combination with a similar connector device or one of a different form. The different form may feature an additional first portion so that in combination with the aforedescribed add-on type connector device a total of three lengths of rigid members may be added about a rigid member that lies within the recesses of the connector devices.

In another variation two connector devices each with a said "additional first portion" may be secured together. Four lengths of rigid member can then be added about the rigid member of an exiting structural assembly.

Embodiments of the invention are now described, by way of example, with reference to the Drawings, in which:

FIGS. 3a, 3b and 3c are plan, end and side views of an add-on connector device of a first embodiment;

Figure 1A:
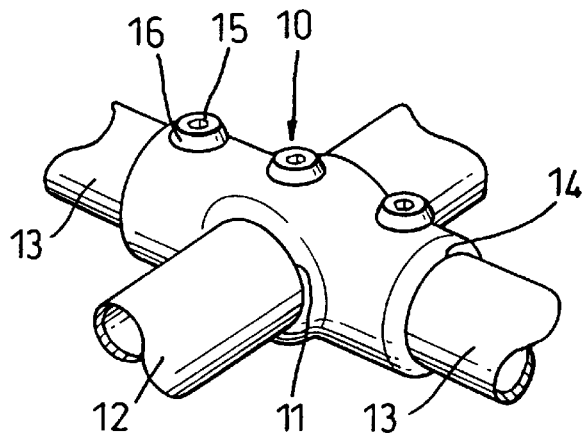
FIG. 1 is a perspective view of a known connector.
Figure 1B:
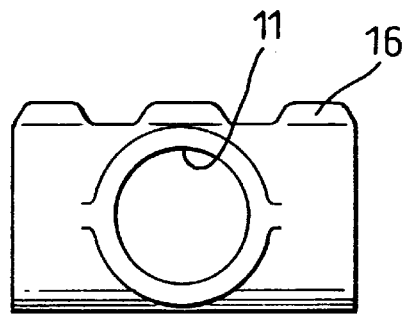

FIG. 1 shows a connector 10, a rigid cast iron device, having a central recess passage 11 through which a first rigid tube 12 extends. Two side tubes 13 are located in respective end passages 14 of the connector. The three tubes are secured to the connector by grub screws 15 in bosses 16. To create the assembly it is necessary to slide the connector 10 along the first tube 12.

Figure 2A:
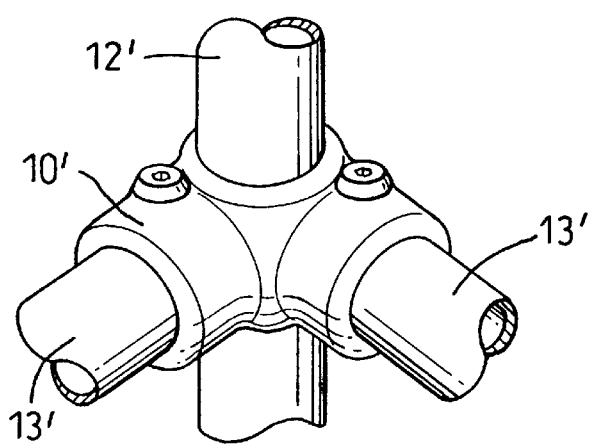
FIG. 2 is a perspective view of another known connector.
Figure 2B:
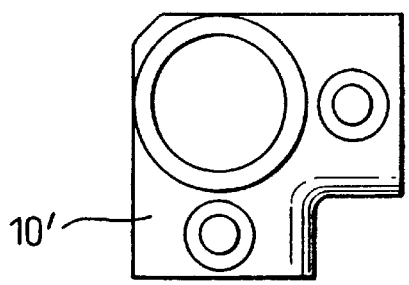

FIG. 2 shows a right angle connector 10' in which, similarly, it is necessary to slide the connector 10' along tube 12' in order to locate side tubes 13' relative to that tube 12' with the tubes mutually at right angles.

The connector device 20 of the invention, shown at FIGS. 3a, b and c, has a tubular body 21 with a first region 22 adapted to receive the end of a side tube (not shown). The body 21 has a second region 23 comprising a recess function 24 of semi-cylindrical shape and two pairs 25,26 of lug formations. The lug formations in effect lie on a plane A—A which is oblique, at 45°, relative to the major axis 28 of the first region 22. Hence one pair 26 of lug formations lies between the first region 22 and a major axis 29 of the recess. The other pair 25 lies beyond the major a 29 of the recess.

Figure 4:
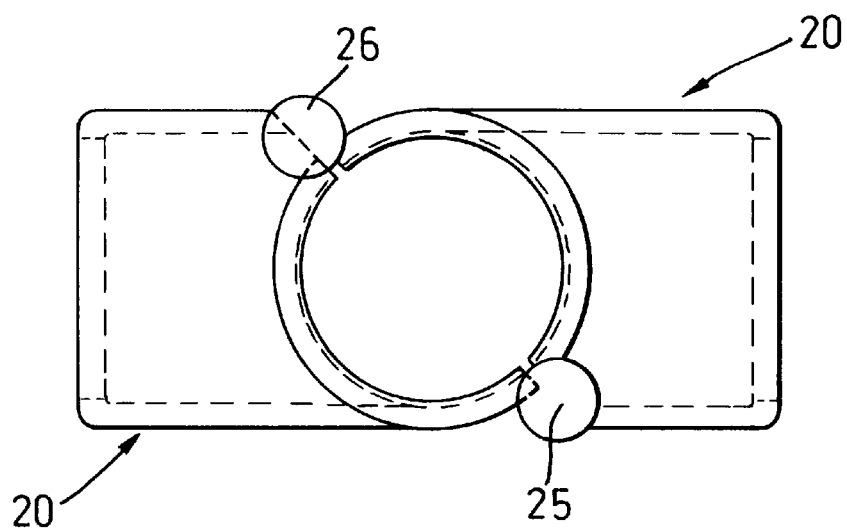
FIG. 4 shows an in-line assembly of two devices of FIG. 3.
Figure 5:
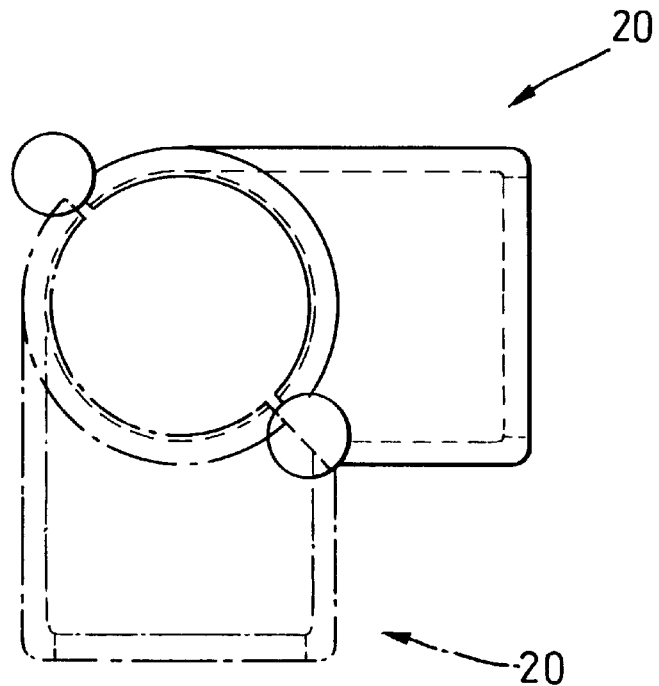
FIG. 5 shows a right angle assembly of two devices of FIG. 3.

The lug formations 25,26 are arranged off-set as viewed in FIG. 3c. In consequence when two of the connector devices 20 are positioned about a tube, which occupies the recesses 24, the lug formations of respective pairs may lie aligned and interdigitated whether the devices are in-line as in FIG. 4 or at right angles as in FIG. 5.

The connector device 20 is provided with a boss and grub screw (not shown) for retention of a side tube in manner.

The lug formations 25,26 are each apertured and both extend through aligned apertures to sure the two devices 20 to one another. Another boss and grub screw arrangement is provided at the recess to tighten the connector devices relative to a tube extending through the recesses.

Figure 6B:
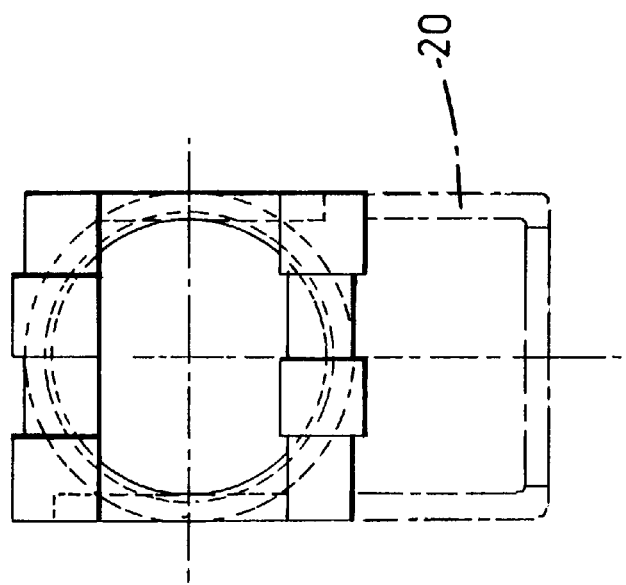
FIGS. 6a and 6b are plan and end views of an add-on connector device of a second embodiment.
Figure 6A:
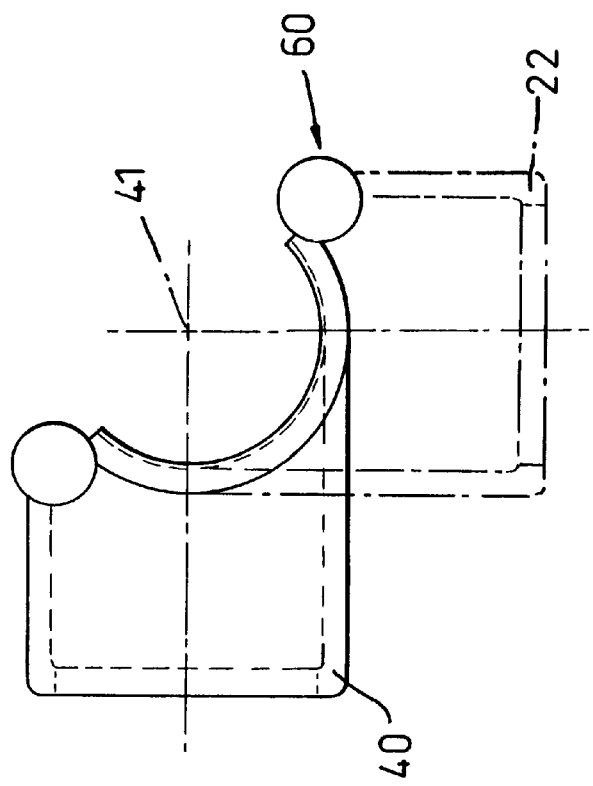

FIGS. 6a and 6b show a connector device 60 similar to the FIG. 3 device but with an additional first region 40. The two first regions 22,40 lie at right angles relative to one another and the major axis 41 of the recess.

Figure 7A:
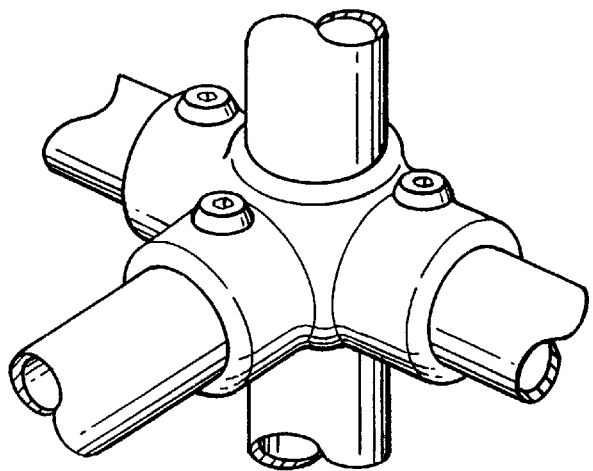
FIGS. 7 and 9 show perspective view of two more known connectors.
Figure 7B:
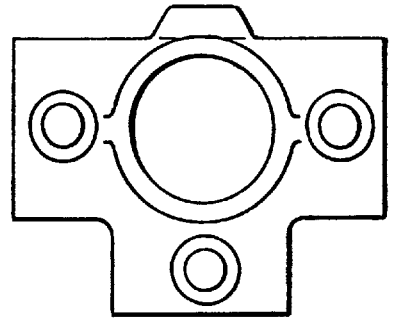
Figure 8:
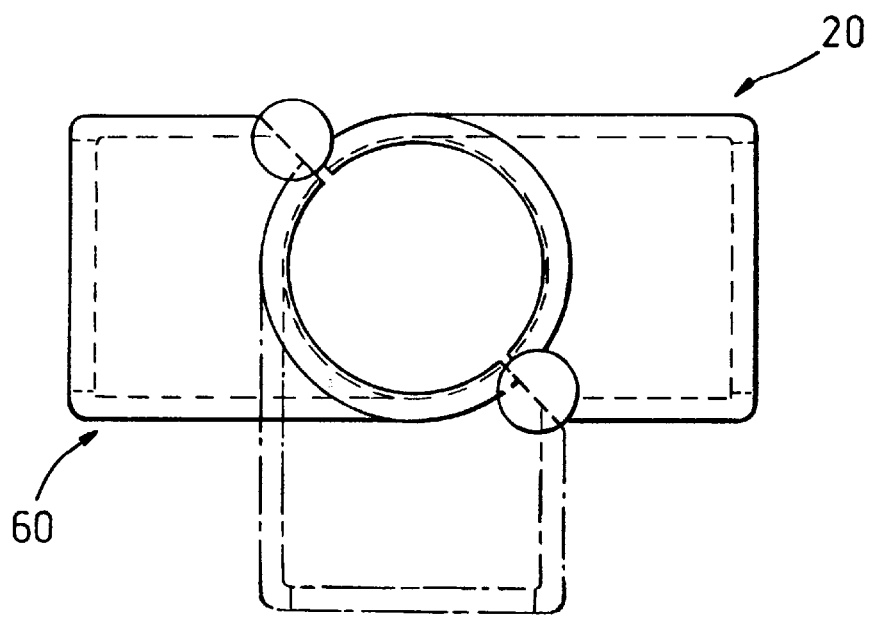
FIG. 8 shows use of add-on connector devices of the invention to create the connection of FIG. 7.

Combining the FIG. 6 device with the FIG. 3 device creates an add-on version of the FIG. 7 connector, as shown by FIG. 8.

Figure 9A:
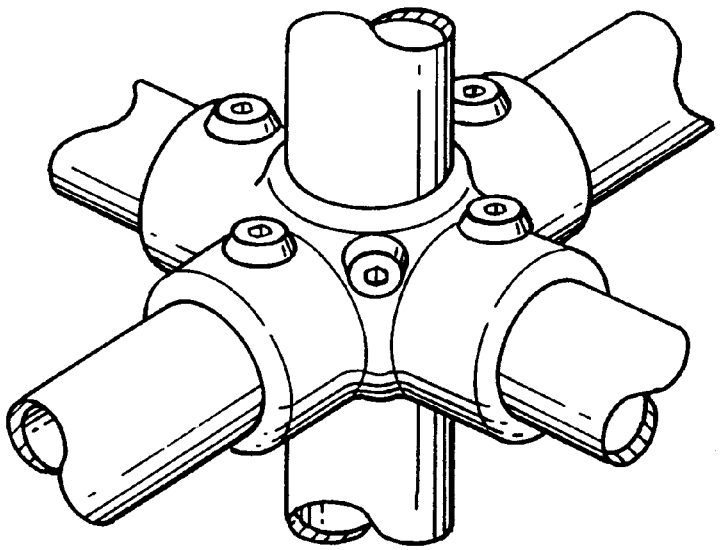
Figure 9B:
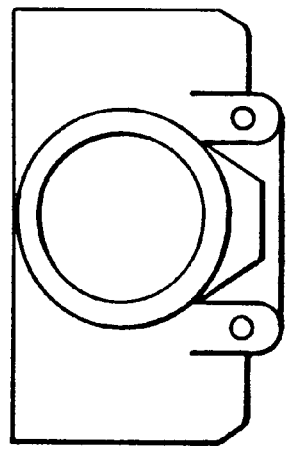
Figure 9C:
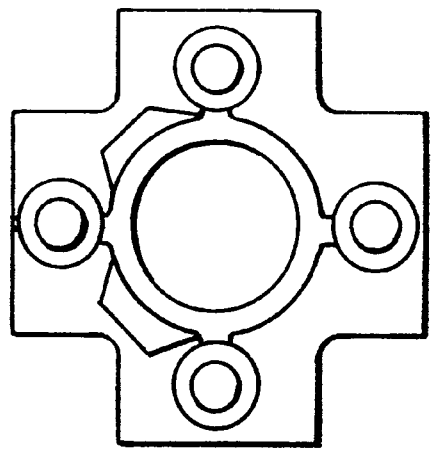

Combining two of the FIG. 6 devices creates an add-on version (not illustrated) of the FIG. 9 connector.

It will be understood that the invention has enabled add-on versions of four connectors (see FIGS. 1, 2, 7 and 8) to be provided from just two types of connector devices, as shown respectively at FIGS. 3 and 6.

We claim:

1. An add-on type connector device comprising a body having a first body region for securing a rigid member and a second body region having an end zone which comprises a recess formation to accommodate a part of the outer periphery of a further rigid member, the end zone additionally comprising first and second end formations arranged spaced apart by said recess formation whereby the first end formation lies between said first body region and said second end formation, and said end formations comprising lug formations arranged and constructed in an offset configuration so that in an assembly of two of said connector devices the respective first and second end formations of one of the connector devices may be selectively interdigitated with either the respective first and second end formations or the respective second and first end formations of the other connector device.

2. An add-on type connector device in accordance with claim 1, wherein the first body region has a longitudinal axis and wherein said end zone of the second body region at least in part lies substantially obliquely relative to said longitudinal axis.

3. A connector device in accordance with claim 1, wherein the recess formation is of substantially semi-cylindrical shape.

4. A connector device in accordance with claim 1, wherein, said lug formations lie at diametrically opposite portions of said recess formation.

5. A connector device in accordance with claim 1, wherein the recess formation comprises a pair of semi-cylindrical bearing surfaces which are spaced apart to bear against longitudinally spaced regions of the further rigid member.

6. A connector device in accordance with claim 1, wherein the first body region has a major axis extending lengthwise therethrough, and said first and second end formations lie equally spaced from said manor axis.

7. A connector device in accordance with claim 1, wherein the first body region has a major axis extending lengthwise therethrough, and one of said first and second end formations lies closer to said major axis than the other of said end formations.

8. A connector device in accordance with claim 1, wherein the end zone of the second body region lies in a plane which is parallel with a longitudinal axis of the recess formation.

9. A connector device in accordance with claim 8, wherein the end zone lies in a plane which intersects said longitudinal axis of said recess formation.

10. A connector device in accordance with claim 8, wherein the first body region has a longitudinal axis and said end formations lie in a plane inclined at 45° to said longitudinal axis of the first body region.

11. A connector device in accordance with claim 8, wherein the first body region has a longitudinal axis and said end formations lie in a plane inclined at 30° to said longitudinal axis of the first body region.

12. A connector device in accordance with claim 1, and comprising an additional first portion for securing a third rigid member.

13. A connector device assembly comprising two connecter devices in accordance with claim 1 and further comprising locking means arranged to extend through aligned apertures in said lug formations of respective connector devices.

14. A connector device assembly in accordance with claim 13, wherein said two connector devices are pivotally interconnected.

15. A connector assembly comprising two connector devices in accordance with claim 1 and further comprising an external member to hold said connector devices captive about a rigid member.

16. A connector device assembly comprising two connector devices in accordance with claim 1 arranged assembled in combination with one another whereby at least three rigid members may be added about a rigid member that is embraced by said two connector devices.

17. A detachable connector assembly for joining plural rigid members, comprising:
two connectors that are identical and wherein each comprises,
a first body portion with a first opening having a first axial direction for receiving one of the rigid members; and
a second body portion connected to said first body portion and with an external face oblique to said first axial direction, said face having a concavity that, when joined with said concavity in the other of said two connectors, forms a second opening for receiving another one of the rigid members,
said second body portion further comprising two sets of plural spaced apart lugs, each of said set of lugs projecting from a different opposing side of said face external to said second opening, said lugs on one said side of said face corresponding to spaces between said lugs on the other said side of said face,
said two connectors being arranged and constructed so that when said two connectors are joined with said lugs of one of said two connectors interdigitated with said lugs of the other of said two connectors in a first manner said first openings of said two connectors are coaxial, and so that when said two connectors are joined with said lugs of one of said two connectors interdigitated with said lugs of the other of said two connectors in a second manner said first openings of said two connectors are not coaxial.

18. The assembly of claim 17, wherein said first openings of said two connectors have first axial directions that are perpendicular when said two connectors are joined in said second manner.

19. The assembly of claim 17, wherein each of said two sets of lugs consists of two lugs.

\* \* \* \* \*